US010197449B2

(12) United States Patent
Herbron

(10) Patent No.: US 10,197,449 B2
(45) Date of Patent: Feb. 5, 2019

(54) DEVICE FOR READING AND TRANSMITTING MEASURED TEMPERATURE VALUES

(71) Applicant: SUEZ Groupe, Paris la Defense (FR)

(72) Inventor: Jean Rene Herbron, Carrieres-sur-Seine (FR)

(73) Assignee: SUEZ Groupe, Paris la Defense (FR)

( * ) Notice: Subject to any disclaimer, the term of this patent is extended or adjusted under 35 U.S.C. 154(b) by 222 days.

(21) Appl. No.: 15/108,261

(22) PCT Filed: Dec. 23, 2014

(86) PCT No.: PCT/FR2014/053538
§ 371 (c)(1),
(2) Date: Jun. 24, 2016

(87) PCT Pub. No.: WO2015/097407
PCT Pub. Date: Jul. 2, 2015

(65) Prior Publication Data
US 2016/0320245 A1    Nov. 3, 2016

(30) Foreign Application Priority Data

Dec. 26, 2013    (FR) .................................... 13 63580

(51) Int. Cl.
| G01K 1/14 | (2006.01) |
| G01D 4/00 | (2006.01) |
| G01K 13/02 | (2006.01) |

(52) U.S. Cl.
CPC ............. *G01K 1/143* (2013.01); *G01D 4/004* (2013.01); *G01K 13/02* (2013.01);
(Continued)

(58) Field of Classification Search
CPC ............. G01K 13/02; G01K 2013/024; G01K 15/007; G01K 17/08; G01K 2207/00; G01K 1/143; G01K 2013/026; H01L 23/34
(Continued)

(56) References Cited

U.S. PATENT DOCUMENTS 7,726,876 B2 * 6/2010 Laverdiere ............ G01J 5/0037
374/121
2009/0045930 A1 * 2/2009 Fu ....................... B60C 23/0408
340/447
(Continued)

FOREIGN PATENT DOCUMENTS

| FR | 2951266 | 4/2011 |
| WO | WO 2008102104 A1 | 8/2008 |

OTHER PUBLICATIONS

International Search Report of International Application No. PCT/FR2014/053538 dated Mar. 13, 2015.

*Primary Examiner* — Daniel S Larkin
*Assistant Examiner* — Anthony W Megna Fuentes
(74) *Attorney, Agent, or Firm* — Finnegan, Henderson, Farabow, Garrett & Dunner LLP

(57) ABSTRACT

A device for reading and transmitting measured temperature values for a device for monitoring a fluid flowing inside a pipe is disclosed. The device may include a temperature sensor configured to provide temperature values in accordance with time and a processing module, as well as a transmitter connected to the temperature sensor and configured to transmit signals that represent said temperature values, and a receiver configured to receive said signals. The temperature sensor may be mounted in a position that is close to the pipe. In addition, the processing module may be configured to assess a temperature variation speed, and of producing a signal to alert of the transformation of the fluid (Continued)

to the solid phase, when the temperature variation speed decreases over a given time interval.

10 Claims, 1 Drawing Sheet

(52) U.S. Cl.
CPC ...... *G01K 2013/026* (2013.01); *Y02B 90/242* (2013.01); *Y04S 20/322* (2013.01)

(58) Field of Classification Search
USPC ....... 374/147, 148, 102, 103, 104, 105, 106, 374/170
See application file for complete search history.

(56) References Cited

U.S. PATENT DOCUMENTS

| | | | |
|---|---|---|---|
| 2011/0037615 A1* | 2/2011 | Borlee | G01R 31/3693 340/870.17 |
| 2012/0206272 A1* | 8/2012 | Borlee | G01F 15/00 340/870.02 |

* cited by examiner

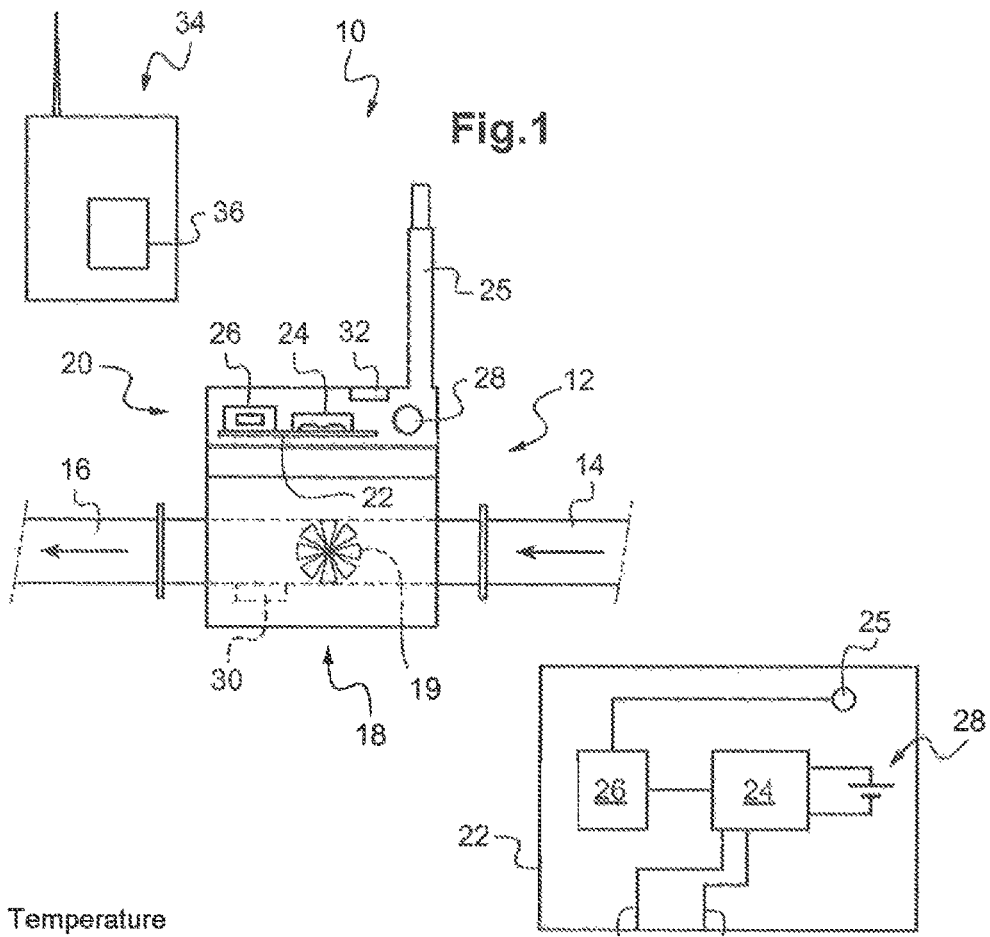
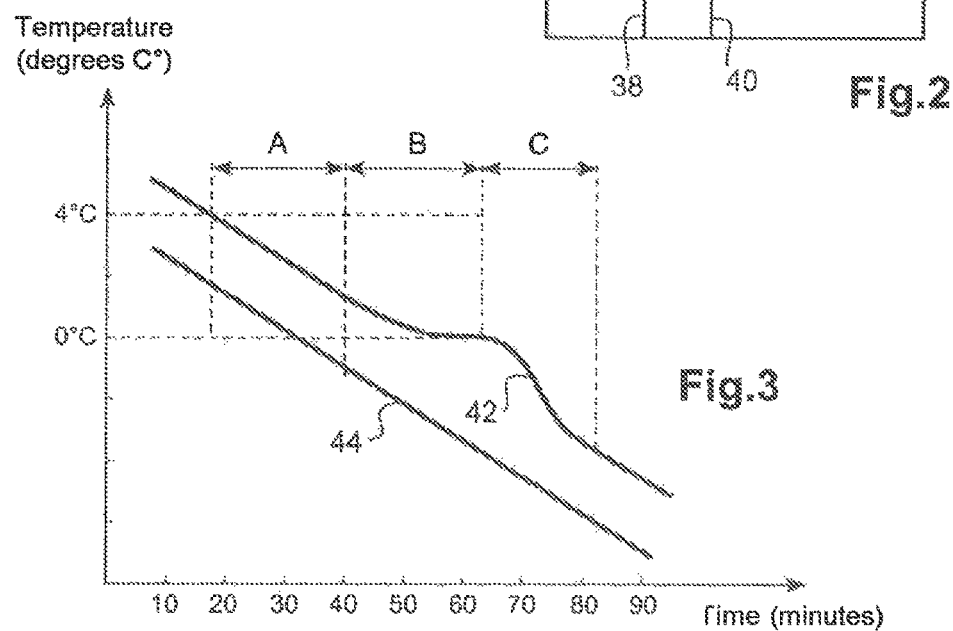

DEVICE FOR READING AND TRANSMITTING MEASURED TEMPERATURE VALUES

CROSS REFERENCE TO RELATED APPLICATIONS

This application is a national stage entry of International Application No. PCT/FR2014/053538 filed on Dec. 23, 2014, and claims priority to and the benefit of the filing date of French Patent Application No. 1363580, filed on Dec. 26, 2013, the entire contents of which are incorporated by reference herein.

The present invention relates to a device for reading and transmitting measured values of temperature for a device for monitoring and/or controlling a fluid flowing inside of a conduit.

One field of application envisioned is notably, but not exclusively, that of metering devices for fluids and, in particular, for water.

The device for reading and transmitting measured values of physical quantities, and in particular of temperature and of flow rate, are well known for the remote measurement of fluid metering and notably of water metering.

Since these are devices for cold water metering, they are of course sensitive to the surrounding temperature, since water solidifies at atmospheric pressure when the temperature is below 0° C. and, moreover and exceptionally, its density decreases. Accordingly, aside from the flow rate, it also is required to be able to measure the temperature existing in the environment surrounding the device.

For this purpose, the device comprises a temperature sensor and a transmitter powered by an electrical battery, installed on the monitoring or controlling device. Furthermore, it comprises a receiver notably allowing the values measured by the temperature sensor to be acquired. Usually, the transmitter is a radiofrequency transmitter. The receiver may acquire the measured values from a plurality of transmitters in order to group them and subsequently, in turn, to re-transmit them to a network in order to be able to process them.

Reference could notably be made to the document FR 2 929 752, which describes such a device. The temperature sensor, the electrical battery and the transmitter form part of the same assembly controlled by a microprocessor.

However, the temperature sensors usually implemented for detecting the temperature are relatively inexpensive and their precision is correspondingly limited, such that the detection of the freezing of water is imprecise. More accurate sensors may be implemented; however, they are more costly. Furthermore, temperature sensors vary over time so that a dispersion in the measurements is observed over time.

Accordingly, one problem that is posed and which the present invention aims to solve is to provide a device for reading and transmitting measured values of temperature that allows a higher precision in the measurement of the value of temperature corresponding to the solidification of the fluid flowing inside of the conduit, and to do this at an advantageous cost. Moreover, another problem is to be able to accurately measure this value of temperature despite the variation of the sensors over time.

With the aim of solving these problems, the present invention provides a device for reading and transmitting measured values of temperature for a device for monitoring and/or controlling a fluid flowing inside of a conduit, said device comprising, on the one hand, a temperature sensor capable of supplying values of temperature as a function of time and a module for processing said temperature values, and on the other hand, a transmitter connected to said temperature sensor so as to be able to transmit signals representative of said temperature values, and a receiver so as to be able to receive said signals. The said temperature sensor is designed to be installed in a position near to said conduit; and said processing module is capable of evaluating a rate of variation of temperature, and of generating a signal warning of the transformation of said fluid into the solid phase, when said rate of variation of temperature decreases within a given interval of time.

Thus, one feature of the invention resides in the tracking over time of the temperature close to the conduit where the fluid is flowing and in the evaluation of a rate of variation of temperature in order to precisely determine the temperature of change of phase of the flowing liquid. Indeed, when the phase of a body changes, for example when a liquid becomes solid, its temperature remains constant. So, when the temperature in the surrounding environment decreases, with an average rate that is substantially constant, over the passage of the change of phase of the body from the liquid state to the solid state, its temperature remains constant until the total solidification of said body. Starting from the onset of this change of phase, the rate of decrease of temperature of the body has a point of inflection and is reduced. The recording at regular intervals of time of the temperature, during this phase change, starting from the liquid state and going toward the solid state, allows this rate to be calculated. It will be observed that the temperature sensor must be sufficiently close to the fluid in question in order to be able to be significantly impacted by the temperature of said fluid.

In this way, irrespective of the precision of the sensor, a signal is generated warning of the freezing of the fluid effectively corresponding to its solidification, and not only by reading the value measured by the temperature sensor, which itself may be inaccurate and may vary over time. Moreover, the temperature sensor implemented can then be of modest qualify and, as a result, less costly.

It will be observed that this type of device may be suitable for a device for monitoring and/or controlling a fluid such as a fluid meter and, in particular, a water meter, a valve actuator or any sensor associated with the flow of a fluid.

According to one particularly advantageous variant embodiment of the invention, the device furthermore comprises another temperature sensor, intended to be installed in a position away from said conduit in order to be able to supply other values of temperature. In addition, said processing module is able to evaluate another rate of variation of temperature, and to generate said warning signal when, furthermore, said other rate of variation of temperature remains substantially constant within said given interval of time. As such, the second temperature sensor then constitutes a reference because this sensor is only subjected to the temperature of the surrounding environment and the variation of temperature of the fluid, during the phase change, has no impact on it. As a consequence, the signal is generated when the rate of variation of one of the sensors decreases significantly with respect to the other rate of variation of said other sensor. The generation of a spurious warning signal is thus avoided, as will be explained in more detail in the following part of the description, when only the temperature of the environment drops as far as the solidification temperature then subsequently increases.

Moreover, according to one particularly advantageous embodiment, said warning signal is generated when said rate of variation of temperature furthermore increases within another given interval of time following said given interval of time. In this way, it is then ensured that the profile of the rate of variation of temperature at the passage through the temperature of change of phase truly corresponds to a solidification. Indeed, after the fluid has been solidified, the rate of variation of its temperature again increases in a manner substantially parallel to the rate of variation of the temperature of the surrounding environment.

According to one preferred feature of the invention, said processing module is mounted onto said receiver. Since the receiver can receive signals representative of the measured values from a plurality of transmitters, the processing module is then shared and is capable of analyzing the measured temperature values from a plurality of fluid monitoring and/or control devices. Moreover, the updates of the program for processing and for analysis of the measured values are more readily implemented within the receiver.

The device according to the invention comprises an electrical battery for powering said transmitter and said temperature sensor. Its lifetime is for example designed to be in the range between 10 and 20 years. Accordingly, the transmitter and the temperature sensor are adapted to a mode of operation allowing the resources of the electrical battery to be conserved. Moreover, the device furthermore preferably comprises a metering sensor connected to said transmitter, so as to supply to said receiver values of volume of fluid flowing inside of said conduit.

Furthermore, said signals representative of said temperature values are transmitted, according to one preferred feature, when the value of temperature supplied by said temperature sensor is lower than a temperature threshold higher than the solidification temperature of water at atmospheric pressure. Thus, depending on the precision of the temperature sensors, a temperature threshold is determined above which the probability with which the fluid is able to solidify is zero. Accordingly, the transmission of the signals corresponding to the temperature values is only carried out when necessary. Thus, the resources of the electrical battery are economized.

Furthermore, said temperature values are advantageously supplied, within said given interval of time, at a frequency in the range between $10^{-2}$ and $10^{-1}$ Hz. For example, the temperature values are supplied every 60 seconds, which allows a significant rate of variation of temperature to be evaluated as a function of the rate of variation of temperature of the environment of the monitoring and/or control device.

According to another subject, the present invention relates to a device for monitoring and/or controlling a fluid flowing inside of a conduit, said device comprising, on the one hand, a body through which said fluid is able to flow and a total volume meter mounted on top of said body and, on the other hand, a device according to the features hereinabove, said temperature sensor being installed on said body. In this way, the temperature sensor is situated as close as possible to the fluid and thus is accurately subjected to its temperature variations. Furthermore, said other sensor is installed on said total volume meter and, preferably, on the opposite side to said first temperature sensor, in such a manner as not to be subjected to the variations in temperature of the fluid, and to only be subjected to the variations in temperature of the environment of the device.

BRIEF DESCRIPTION OF THE DRAWINGS

Other features and advantages of the invention will become apparent upon reading the description presented hereinafter of particular embodiments of the invention, given by way of non-limiting examples and with reference to the appended drawings in which:

FIG. 1 is a schematic view of the measurement and transmission device according to the invention;

FIG. 2 is a schematic diagram of one element of the device illustrated in FIG. 1; and FIG. 3 is a graph illustrating the principle of operation of the device illustrated in FIG. 1.

DETAILED DESCRIPTION

FIG. 1 shows a device 10 for reading and transmitting measured values of temperature, but also of flow rate, used for a water meter 12. The reading and transmission device 10 is then aimed at not only periodically reading the quantity of water consumed, but also at detecting the onset of the freezing of the water at 0° C. in the meter 12. The water meter 12 is installed between a water outlet from a water distribution conduit 14 and an inlet 18 of a private water circuit, for example an individual dwelling. It has a body 18 including a turbine or a means for volume measurement 19 and through which the water flows, and a meter 20 including a transducer, not shown, allowing the movements of the turbine 19 to be transformed into a consumption electrical signal. More precisely, the transducer allows the mechanical movement of the turbine 19 to be transformed into numerical information. The meter 20 is also equipped with an electronic circuit 22 comprising a first microprocessor 24 and a radiofrequency transmitter 26 connected to the first microprocessor 24. An antenna 25 is also mounted on top of it and is connected to the transmitter 26. The electronic circuit 22 is powered by an electrical battery 28.

The device 10 is also equipped with a first temperature sensor 30 installed in the body 18 against the water flow channel, or hydraulic chamber, which temperature sensor 30 is connected to the first microprocessor 24. It is also equipped, according to another variant embodiment, with a second temperature sensor 32 situated on the top of the total volume meter 20 and connected, just like the first, to the microprocessor 24. It will be observed that the temperature sensors 30, 32 are inexpensive sensors, composed for example of a platinum resistance sensor, whose precision is of the order of +/−1° C.

The device 10 furthermore comprises a receiver 34 equipped with a processing module 38 including a second microprocessor and a memory, it will be observed that the receiver 34 may be associated with a plurality of transmitters 26 and, as a consequence, with a plurality of water meters 12. Furthermore, the receiver 34 may itself be connected to a centralizing network via radio or else wired link. Thus, the numerical information corresponding to the flow rate of water through the body 18 is communicated to the transmitter 28 by means of the microprocessor 24, as is the information supplied by the temperature sensors 30, 32.

FIG. 2 shows the electronic circuit 22 in more detail. The microprocessor 24 can be seen connected, on the one hand, to the transmitter 26 and, on the other hand, to the electrical battery 28. The transmitter 26 is connected to the antenna 25, whereas the microprocessor 24 has a first link 38 intended to be connected to the first temperature sensor 30 and a second link 40 intended to be connected to the second temperature sensor 32. The microprocessor 24 is also directly connected to the transducer.

Thus, by virtue of the microprocessor 24, the values of temperature measured by the first temperature sensor 30 are sampled with a period, for example, of the order of a minute, i.e. at a frequency of $1.67 \times 10^{-2}$ Hz. In this way, the corresponding temperature values are communicated to the transmitter 28 which in turn transmits signals representative of said values to the receiver 34. The latter, by means of the processing module 38, is able to store the corresponding values of temperature and to process them.

Furthermore, and with the aim of conserving the electrical battery 28, and according to one particularly advantageous embodiment of the invention, the microprocessor 24 communicates measured values of temperature only when these temperatures are for example below 4° C. In this way, in view of the precision of the temperature sensor 30, the measured values of temperature will only be communicated to the transmitter 26 as they approach the solidification temperature of the water via positive values. Transmitting measured values of temperature when there is no risk of freezing will thus be avoided.

Thus, starting from the point at which the values of temperature measured by the first temperature sensor 30 are below 4° C., according to the aforementioned example, the microprocessor 24 communicates all the measured values to the transmitter 26 with a periodicity of 60 seconds for example, and the transmitter 26 emits signals representative of the measured values so as to transmit them to the receiver 34. The processing module 36 then analyzes these temperature values and calculates a rate of variation of temperature.

Reference is now made to FIG. 3 in order to describe the analysis of the temperature values, when the temperature experienced by the first temperature sensor 30 drops below 4° C. The assumption will be made here that the temperature in the environment of the water meter 12 decreases in a uniform and continuous manner, in a first step A, the values of temperature measured as a function of time, and defining the curve 42, are continuously decreasing and in a uniform manner. Thus, the rate of variation of the temperature is constant and the slope of the corresponding curve in the figure is rectilinear and negative. From the point at which the water contained or flowing within the body 18 of the water meter 12 approaches its solidification temperature, the rate of variation of temperature decreases, since, during the transformation of the water from its liquid state to its solid state, the temperature remains constant. Accordingly, the first temperature sensor 30 situated close to the hydraulic chamber is subjected to the variations in temperature of the water that it contains, and thus the measured values of temperature show a reduction in the rate of variation of the temperature. This decrease in rate of variation of temperature calculated by the processing module 38 corresponds to a second step B illustrated in FIG. 3.

The reduction in the rate of variation of temperature corresponding to the step B results in a variation of the slope along the curve up to a plateau. Thus, the processing module 36 generates a warning signal, for example from the point at which the three successive rates of variation of temperature progressively deviate from the constant value corresponding to the step A with falling slope. This warning signal is for example associated with time stamp information supplied by the clock of the second microprocessor, and is transmitted to the central network. Accordingly, it will be understood that a warning signal may be generated in a reliable manner, with a low-cost temperature sensor, by monitoring the rate of variation of the measured values of temperature in the neighborhood of the temperature of change of state of the water.

According to another embodiment, the temperature values measured by virtue of the second temperature sensor 32 are used, which sensor is situated at the top of the total volume meter 20 of the water meter 12. Accordingly, the second temperature sensor 32 allows the temperature in the environment of the water meter 12 to be sensed and is completely insensitive to the rate of variation of temperature corresponding to the change of phase of the water flowing through the water meter 12. Moreover, just like for the first temperature sensor 30, the microprocessor 24 communicates values of temperature measured by the second sensor 32 only when these temperatures are below 4° C.

It will be assumed that the temperature of the surrounding environment, sensed by the second temperature sensor 32, is substantially lower than the value of temperature sensed by the first sensor 30 because it is less thermally protected. Accordingly, when the temperature in the environment of the water meter 12 decreases in a uniform and continuous manner, the processing module 38 calculates the rate of variation of temperature corresponding to the values of temperature measured as a function of time by the second temperature sensor 32, and this rate corresponds to the slope of the straight line 44.

Accordingly, according to this second embodiment, the processing module compares each value of temperature measured at the same moment by the two temperature sensors 32, 30. Thus, as illustrated in FIG. 3, whenever the difference is constant, it is considered that the water flowing in the body 18 of the water meter 12 is in the liquid phase. On the other hand, whenever the values respectively measured by the two temperature sensors 32, 30 progressively move apart, it is considered that the water is starting to solidify. Thus, the processing module 38 generates the warning signal.

This second embodiment allows the case to be highlighted where the temperature of the water flowing through the body 18 of the water meter 12 comes close to the solidification temperature without reaching it, since this embodiment indeed allows the onset of freezing to be detected substantially earlier.

The first two embodiments allow the change of phase of the water flowing in the body 18 of the water meter 12 to be detected within a given interval of time corresponding to a temperature interval included substantially between 4° C. and 0° C. According to a third embodiment, the detection of freezing may be carried out in an even more reliable manner, within an interval in the range for example between 4° C. and −4° C. and according to which, in a third step C, the rate of variation of temperature from the values of temperature measured by the first temperature sensor 30 is recorded. Indeed, in this third step C, the rate of variation of temperature, after becoming substantially equal to zero around the temperature of change of phase of the water, is going to subsequently accelerate when all the water has become solid.

Accordingly, it is also possible to program the processing module 36 so that it only generates a warning signal under the dual condition that the rate of variation of temperature provided by the measured values from the first temperature sensor 30 has decreased according to the step B, during a first interval of time, and that it has subsequently increased, according to the step C, over a second interval of time immediately succeeding the first.

Furthermore, the time variation of the rates of variation of the temperature, supplied by the measured values from the first temperature sensor 30, may be compared with respect to the rates of variation of the temperature supplied by the measured values from the second temperature sensor 32 during the aforementioned two intervals, in order to generate the warning signal.

It will of course be understood that the device for reading and transmitting measured values of temperature may be adapted to any device for monitoring and/or controlling a fluid, and for example to a stop valve.

The invention claimed is:

1. A device configured to read and transmit measured values of temperature for a device configured to monitor and control a fluid flowing inside of a conduit, wherein the device configured to read and transmit measured values of temperature comprises:
   a temperature sensor configured to supply values of temperature as a function of time;
   a processing module configured to process the temperature values;
   a transmitter connected to the temperature sensor and configured to transmit signals representative of the temperature values; and
   a receiver configured to receive the signals,
   wherein the temperature sensor is configured to be installed in a position close to the conduit; and
   wherein the processing module is configured to evaluate a rate of variation of temperature and generate a signal warning of a transformation of the fluid into a solid phase when the rate of variation of temperature decreases within a given interval of time.

2. The device as claimed in claim 1, further comprising another temperature sensor configured to be installed in a position away from the conduit and supply other values of temperature, wherein the processing module is configured to evaluate another rate of variation of temperature and generate the warning signal when the another rate of variation of temperature remains substantially constant within the given interval of time.

3. The device as claimed in claim 1, wherein the warning signal is generated when the rate of variation of temperature increases within another given interval of time following the given interval of time.

4. The device as claimed in claim 1, wherein the processing module is mounted onto the receiver.

5. The device as claimed in claim 1, further comprising an electrical battery configured to supply the transmitter and the temperature sensor.

6. The device as claimed in claim 1, further comprising a metering sensor connected to the transmitter and configured to supply to the receiver values of volume of fluid flowing inside of the conduit.

7. The device as claimed in claim 1, wherein the signals representative of the temperature values are transmitted when the value of temperature supplied by the temperature sensor is lower than a temperature threshold, the temperature threshold being higher than a solidification temperature of the fluid at atmospheric pressure.

8. The device as claimed in claim 1, wherein the temperature values are supplied, within the given interval of time, at a frequency in the range between $10^{-2}$ and $10^{-1}$ Hz.

9. A device configured to monitor and control a fluid flowing inside of a conduit, wherein the device comprises:
   a body through which the fluid is able to flow;
   a total volume meter mounted on top of the body; and
   a device as claimed in claim 1, wherein the temperature sensor is installed on the body.

10. The device configured to read and transmit measured values of temperature as claimed in claim 9, further comprising another temperature sensor configured to be installed in a position away from the conduit and supply other values of temperature,
   wherein the processing module is configured to evaluate another rate of variation of temperature and generate the warning signal when the another rate of variation of temperature remains substantially constant within the given interval of time, and
   wherein the another temperature sensor is installed on the total volume meter.

* * * * *